United States Patent
Robbins et al.

(10) Patent No.: US 7,434,594 B1
(45) Date of Patent: Oct. 14, 2008

(54) INFLATION/DEFLATION VALVE FOR CARGO DUNNAGE

(76) Inventors: James A. Robbins, 1527 Roane St., Covington, TN (US) 38019; James A. Lynch, 2660 Jeff Webb Rd., Ripley, TN (US) 38063; S. Matt McCann, 28 Johnsborough Dr., Atoka, TN (US) 38004

( * ) Notice: Subject to any disclaimer, the term of this patent is extended or adjusted under 35 U.S.C. 154(b) by 157 days.

(21) Appl. No.: 11/505,026

(22) Filed: Aug. 15, 2006

Related U.S. Application Data

(63) Continuation-in-part of application No. 11/202,512, filed on Aug. 12, 2005, now Pat. No. 7,273,065.

(51) Int. Cl.
*F16K 15/20* (2006.01)

(52) U.S. Cl. .................... 137/223; 251/149.9; 222/548; 410/125

(58) Field of Classification Search ................. 137/223; 222/548; 251/149.4, 149.8, 149.9, 82; 410/124, 410/125, 119
See application file for complete search history.

(56) References Cited

U.S. PATENT DOCUMENTS

| | | | | |
|---|---|---|---|---|
| 1,276,325 A * | 8/1918 | Carling | ........................ | 137/223 |
| 2,772,692 A * | 12/1956 | Russell | ........................ | 137/223 |
| 2,790,571 A * | 4/1957 | Flaith et al. | ............... | 251/149.9 |
| 3,785,395 A * | 1/1974 | Andreasson | ................ | 137/223 |
| 3,995,626 A * | 12/1976 | Pearce, Jr. | ................. | 251/149.4 |
| 4,015,622 A * | 4/1977 | Pagani | ........................ | 137/223 |
| 4,271,865 A * | 6/1981 | Galloway et al. | ........ | 251/149.9 |
| 4,386,639 A * | 6/1983 | Gable et al. | .............. | 251/149.6 |
| 4,478,587 A * | 10/1984 | Mackal | ........................ | 137/224 |
| 4,579,141 A * | 4/1986 | Arff | ............................ | 137/223 |
| 4,602,654 A * | 7/1986 | Stehling et al. | ............. | 137/296 |
| 4,766,628 A * | 8/1988 | Walker | ........................ | 137/232 |
| 4,844,408 A * | 7/1989 | Beaston | .................... | 251/149.8 |
| 4,862,918 A * | 9/1989 | Schroeder | ................ | 251/149.4 |
| 4,927,397 A * | 5/1990 | Yeager | ........................ | 137/234 |
| 5,048,578 A * | 9/1991 | Dorf et al. | .................. | 141/346 |
| 5,111,838 A * | 5/1992 | Langston | ..................... | 137/223 |
| 5,339,959 A * | 8/1994 | Cornwell | .................. | 206/524.8 |
| 5,367,726 A * | 11/1994 | Chaffee | ...................... | 137/223 |

(Continued)

*Primary Examiner*—John Rivell
*Assistant Examiner*—Craig Price
(74) *Attorney, Agent, or Firm*—Wyatt, Tarrant & Combs, LLP

(57) ABSTRACT

A valve assembly for a dunnage bag wherein in one embodiment of the valve a valve diaphragm is mounted on a shaft and is supported by a mounting bar such that the valve diaphragm may be reciprocally moved from the closed position to the open position by a simple axial push on the valve shaft. The valve shaft is retained in the mounting bar in an orifice and the shaft diameter is enlarged at its end distant from the valve diaphragm so as to generate a frictional force fit or lock in the open position to facilitate the removal of air from the bag. The valve may be released form the friction lock by the air pressure of a recharged bag and/or by the manual movement of the valve diaphragm and shaft axially toward the open end of the valve assembly. In an alternate embodiment, the valve diaphragm is mounted to a valve stem that it rotationally and axially moveably connected to the valve body. The valve may be frictionally locked in its open or closed position by rotation that valve stem no more than one quarter turn.

15 Claims, 9 Drawing Sheets

U.S. PATENT DOCUMENTS

| | | | |
|---|---|---|---|
| 5,387,017 A * | 2/1995 | Gill | 251/149.8 |
| 5,405,120 A * | 4/1995 | Kerpan et al. | 251/149.9 |
| 5,425,479 A * | 6/1995 | Credle, Jr. | 251/149.9 |
| 5,505,428 A * | 4/1996 | De Moss et al. | 251/149.9 |
| 5,806,572 A * | 9/1998 | Voller | 410/119 |
| D406,238 S * | 3/1999 | Voller | D9/446 |
| 5,904,302 A * | 5/1999 | Brown | 251/149.9 |
| 5,960,840 A * | 10/1999 | Simmel et al. | 251/149.8 |
| 6,089,251 A * | 7/2000 | Pestel | 137/234.5 |
| 6,138,711 A * | 10/2000 | Lung-Po | 137/527.8 |
| 6,234,224 B1 * | 5/2001 | Schultz, Jr. | 251/149.9 |
| 6,935,073 B2 * | 8/2005 | Scherba | 251/149.8 |
| 7,008,155 B2 * | 3/2006 | Smith et al. | 410/119 |
| 7,055,794 B1 * | 6/2006 | Tang | 251/82 |
| 7,063,102 B2 * | 6/2006 | Lin | 137/223 |
| 7,066,442 B2 * | 6/2006 | Rose | 251/149.8 |
| 7,121,302 B2 * | 10/2006 | Hwang | 137/599.18 |
| 7,195,029 B2 * | 3/2007 | Wass | 137/223 |
| 7,231,739 B2 * | 6/2007 | Scherba | 251/149.8 |
| 2006/0108556 A1 * | 5/2006 | Rose | 251/149.8 |
| 2006/0266416 A1 * | 11/2006 | Chen | 137/223 |
| 2008/0017818 A1 * | 1/2008 | Tang | 251/82 |

* cited by examiner

INFLATION/DEFLATION VALVE FOR CARGO DUNNAGE

CROSS-REFERENCE TO RELATED APPLICATIONS

This application is a continuation-in-part of U.S. patent application Ser. No. 11/202,512 that was filed on Aug. 12, 2005 now U.S. Pat. No. 7,273,065 and entitled "Inflation/Deflation Valve for Cargo Dunnage," which is hereby incorporated by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to inflatable dunnage air bags as are utilized in securing cargo and/or freight in a cargo hold, such as a truck, rail car, aircraft or ship and more particularly, to an inflation valve therefor.

2. General Background of the Invention

Inflatable air bags are utilized in the cargo transportation industry to secure a load against undue movement during the transportation phase. While cargo is generally loaded as snugly into a vehicle as possible, such as a cargo hold of a truck or rail car, it is frequently of sufficiently irregular shape or varied size, it is not otherwise possible to ensure a tight fit during the loading process The transportation industry has adopted relatively large inflatable bags, often a plastic or rubber so as to be flexible and to readily conform to the irregular shapes of cargo loads. These bags are inserted into observable spaces in a load, and inflated with air to a pressure sufficient to keep the freight from shifting during the movement of transit, whether it be from swaying or being bounced vertically.

The dunnage bags are comprised of an inflatable bladder which is enclosed within an outer covering (also a bag) which protects the bladder from wear or puncture. The outer bags are frequently of fabric or paper. Bags may be of a variety of shapes and sizes, such that an appropriate shape or size may be fitted into the several voids that inevitably occur in a loaded container. Once fitted into the void, a bag/bladder is inflated with compressed air to a predetermined pressure level sufficient to prevent or retard the shifting or movement that otherwise occurs in travel.

One critical part of the dunnage bag is the valve which enables the rapid, facile inflation and deflation required in the loading and emptying of the container. Conventional construction includes the valve (a thermoplastic material) "welded" to the bladder so as to ensure a secure seal to retain the desired air pressure. The valve includes a generally tubular body portion which defines a conduit for the entry and exhaust of the pressurized air into and out of the bag. Within this tubular body is mounted a valve member which seats on a cooperating seal, usually a ring, the combination of which provides a tight joinder, particularly for the pressurized situation, to retain the pressurized air in the bag providing the desired load security against movement, and shifting. Many conventional valves are spring loaded to the closed position to facilitate the seal of the charged air, allowing also the manual depression against the spring to open the valve for natural deflation. Another common construction incorporates a hinged valve member that securely seats to form a seal. A number of patents are illustrative of the state of the art.

U.S. Pat. No. 4,579,141 Arf illustrates a valve for filling and discharging inflatable hollow bodies, in this instance a dinghy. The valve is self closing, as is conventional of valves for dunnage bags. The valve plate is spring loaded, to the closed position by radial leaves which cause the valve plate to bear on a sealing ring, when the valve is in the inactivated state.

U.S. Pat. No. 5,651,403 to Andersen shows a valve for sack, such as a dunnage bag, to be filled with pressurized air through a nozzle to the valve. The valve is hinged and opens the filling nozzle in relation to the sealing flange.

U.S. Pat. No. 6,823,905 to Smith, et al shows an alternative inflation valve for a dunnage bag having a flapper valve member which is affixed on a chordal segment of the circular valve opening. Opposite end portions of the fixation bar project radially inwardly toward each other so as to define detents for maintaining the valve in the open position.

SUMMARY OF THE INVENTION

The present invention is directed to a novel valve for a dunnage bag which provides improved functionality by having a piston-like operational structure for the valve diaphragm and shaft enabling secure filling and sealing of the bag against air leakage, yet simple release of the valve diaphragm for facile, rapid emptying of the bag facilitating the removal of the bag when unloading cargo. In an alternative embodiment, the present invention utilizes a valve stem that can be moved axially and rotationally relative to the valve body to provide improved functionality enabling secure filling and sealing of the bag against air leakage, yet simple release of the valve diaphragm for facile, rapid emptying of the bag facilitating the removal of the bag when unloading cargo.

Among the further objects of the present invention are the providing of a dunnage bag valve assembly which overcomes the operational drawbacks of many prior art inflation valves.

A further object of the present invention is to provide an improved valve assembly which includes a minimized number of operational parts so as to lessen the likelihood of malfunction.

A still further object of the present invention is to provide an improved valve assembly for a dunnage bag that may be manually moved to an open condition, in which condition the valve diaphragm is retained open for rapid, complete emptying of the bag of air.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
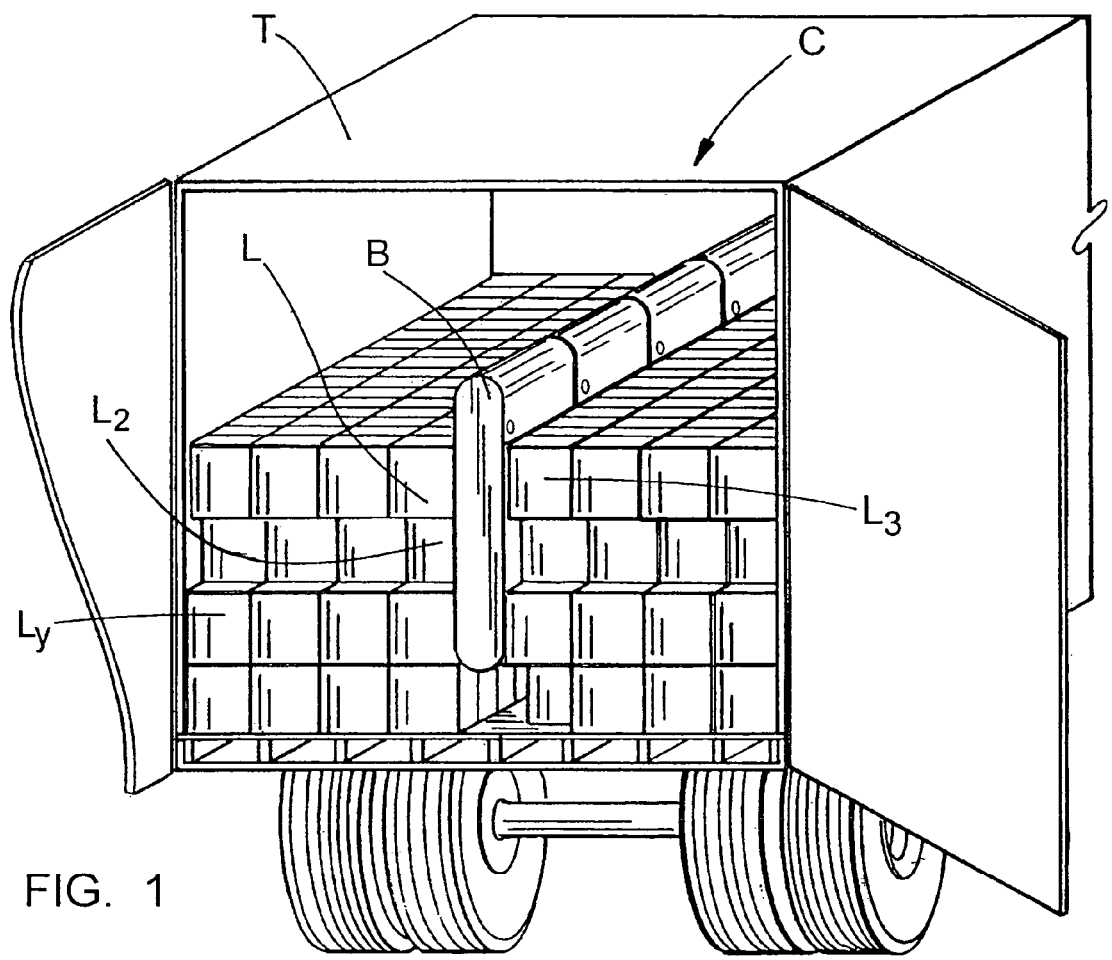
FIG. 1 is a pictorial view showing use of a dunnage bag incorporating the present invention.
Figure 2:
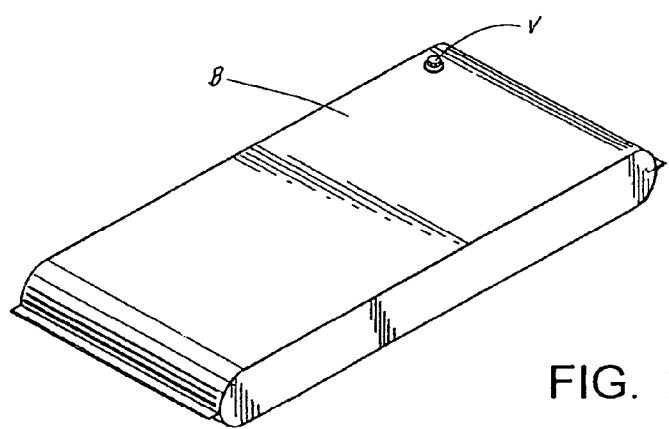
FIG. 2 is a pictorial view of a dunnage bag incorporating the present invention.

FIGS. 1 and 2 show generally the application of the dunnage bag in which the present invention has use. FIG. 1 illustrates a bag B disposed in the cargo area C of a truck trailer T intermediate load articles $L_1, L_2, L_3, \ldots L_y$. FIG. 2 generally illustrates a dunnage bag having a valve V for inflation and deflation. Dunnage bags are used principally in long haul transportation of boxed or crated loads. As known in the art, it is important to secure the load against shifting and other movement which might allow the cargo to become damaged. Dunnage bags have become a very useful tool to be placed into openings between adjacent boxes or crates.

In use, the bags are located in the desired space in the cargo container and inflated to a preferred pressure. It is important that the valve assembly 10 attached to the dunnage bag be simple and reliable in use, otherwise the loading process will be delayed. Likewise, it is important that the valve assembly 10 retain a good seal throughout the transit, otherwise the security of the load be compromised. It is an objective of the present invention to provide a valve having as simple a construction as is effective to maintain a proper seal on pressurization, yet permitting a quick and effective discharge of the contained air when the transportation run is terminated and unloading of the cargo is effected. Two general styles of construction are evidenced by the prior art. The first is a hinged valve member, seating on a rib or flange forming a valve seat. the second version is a circular valve which seats on a cooperating circular flange, and is spring loaded in the closed position, thus requiring a continuing activation to exhaust any air loaded into it. Both of the prior art versions of valves are subject to malfunction, and tend to be significantly more expensive that the present invention. The virtue of the present design is its simplicity, being a circular valve that is mounted on a shaft which is easily moveable to the open or closed position. the pressure of the loaded air in pressurizing the dunnage bag retains the valve in the closed position when in use in transit. The frictional engagement of a portion of the mounting shaft on a ring mount retains the valve in the open condition for efficient, expedient emptying of the dunnage bag. The simplicity of the construction provides the low cost and the reliability of the design. As known by those skilled in the art, bags and valves are constructed of various types of polymer materials, frequently thermoplastics. resilient components may also be fabricated of one of several suitable rubbers.

Figure 3:
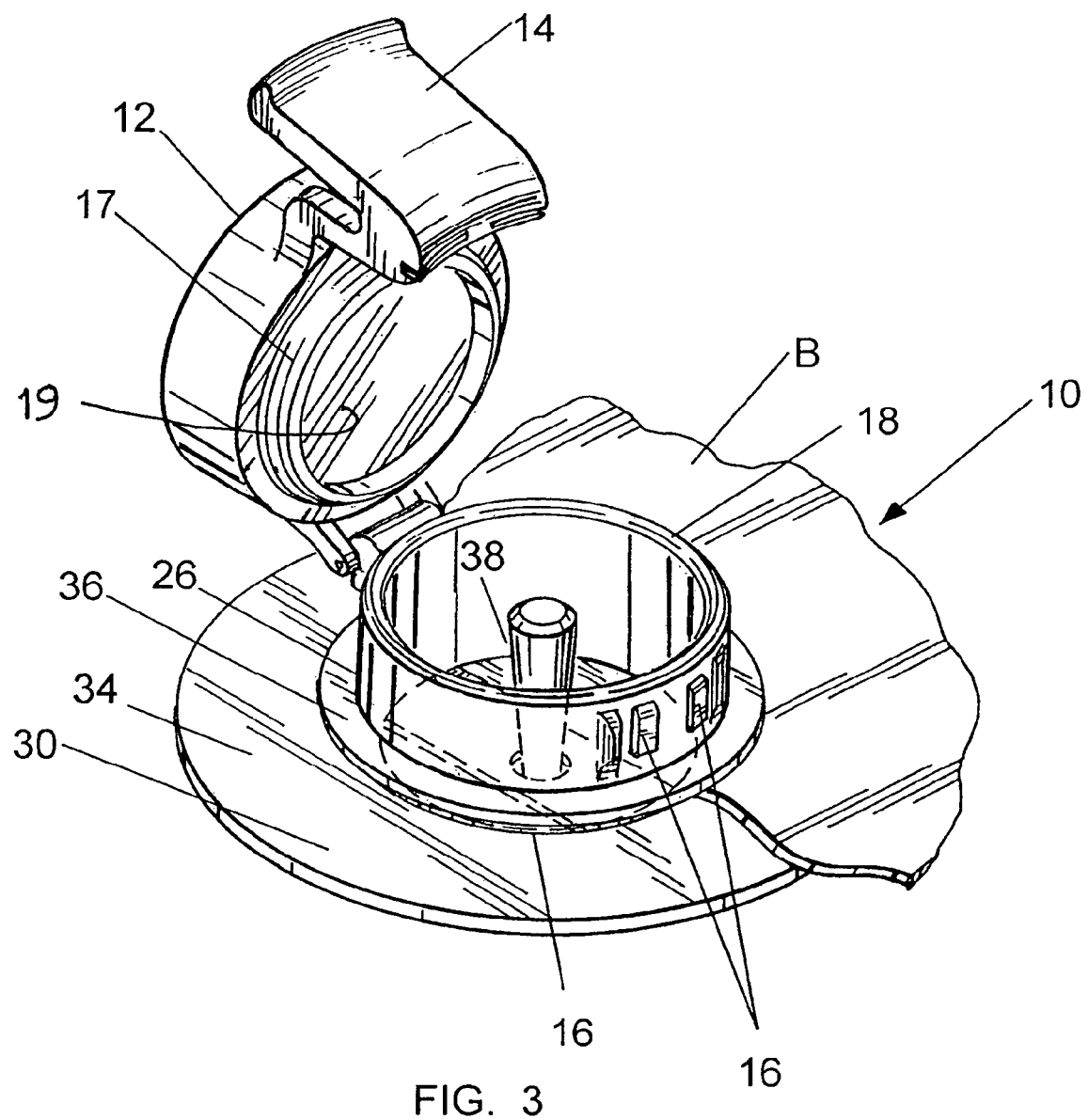
FIG. 3 is a perspective view of a preferred embodiment of the valve of the present invention
Figure 4:
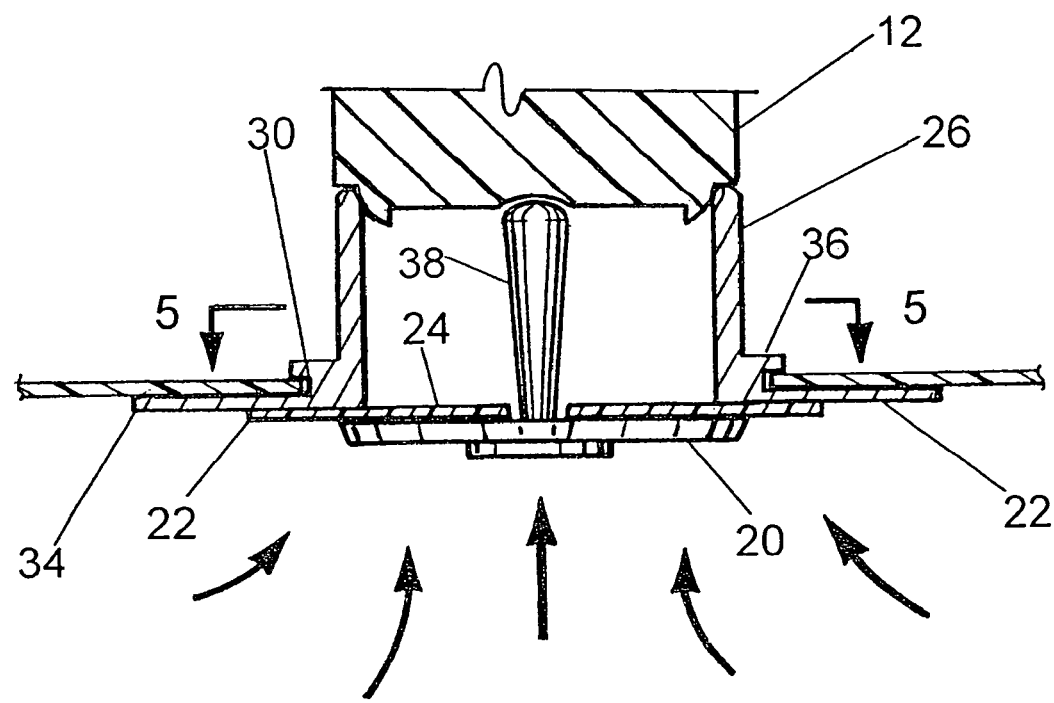
FIG. 4 is a side elevation view of the valve illustrated in FIG. 3.
Figure 5:
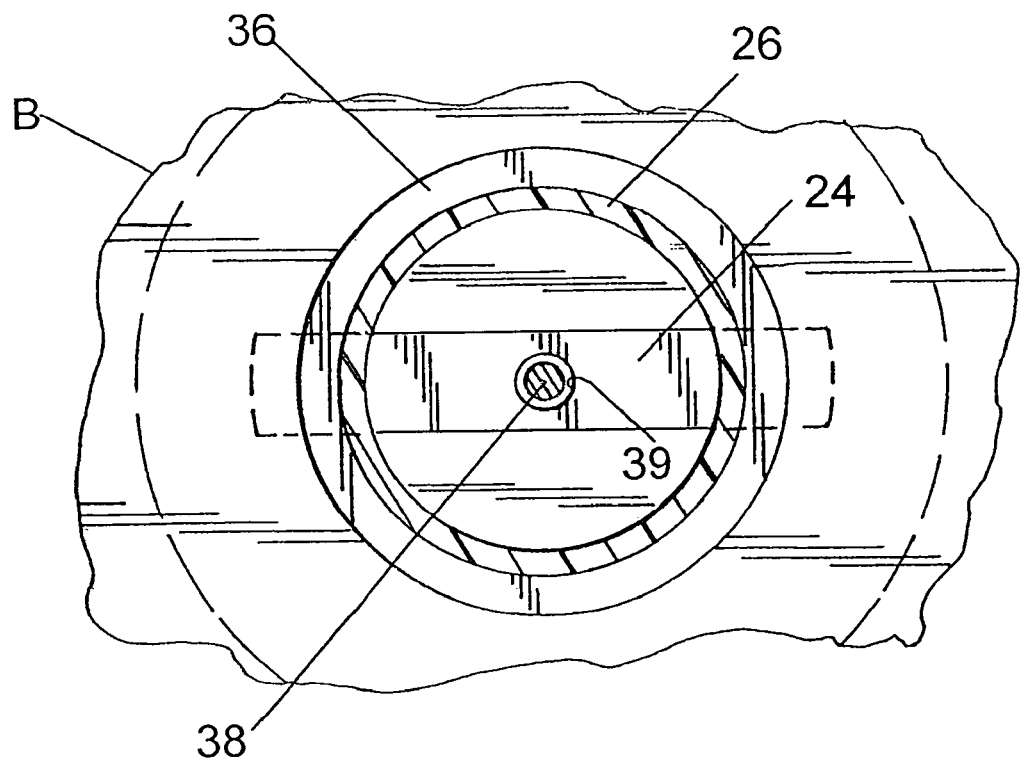
FIG. 5 is a top view of the valve illustrated in FIG. 3, with the cap removed.
Figure 6:
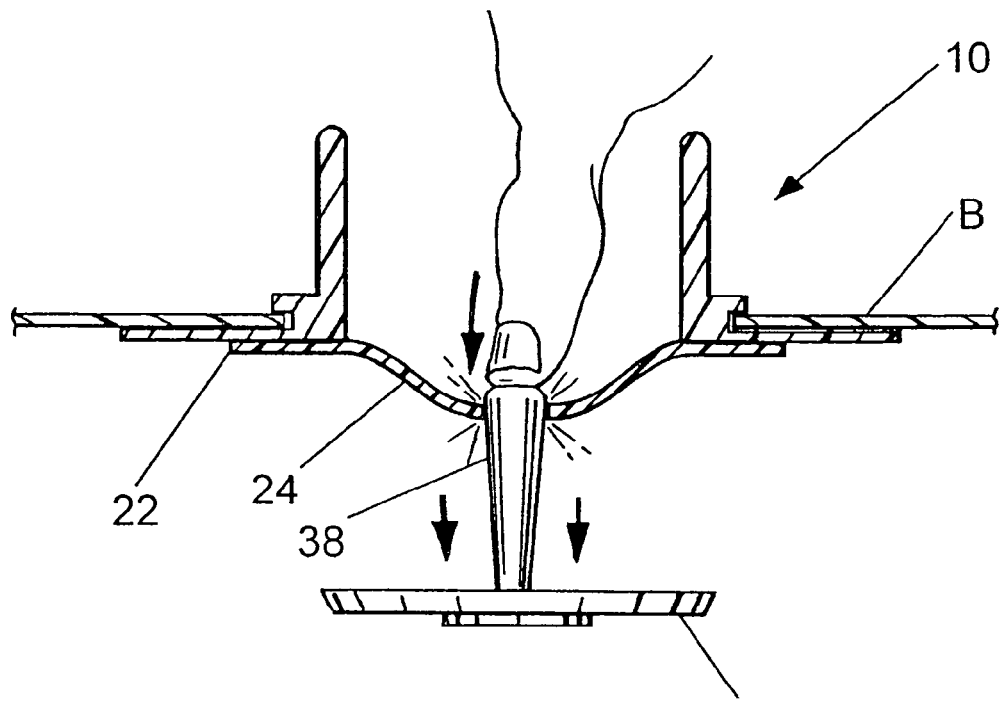
FIG. 6 is a side elevation view of the valve illustrated in FIG. 4, further illustrating opening of the valve for deflation of the dunnage bag.
Figure 7:
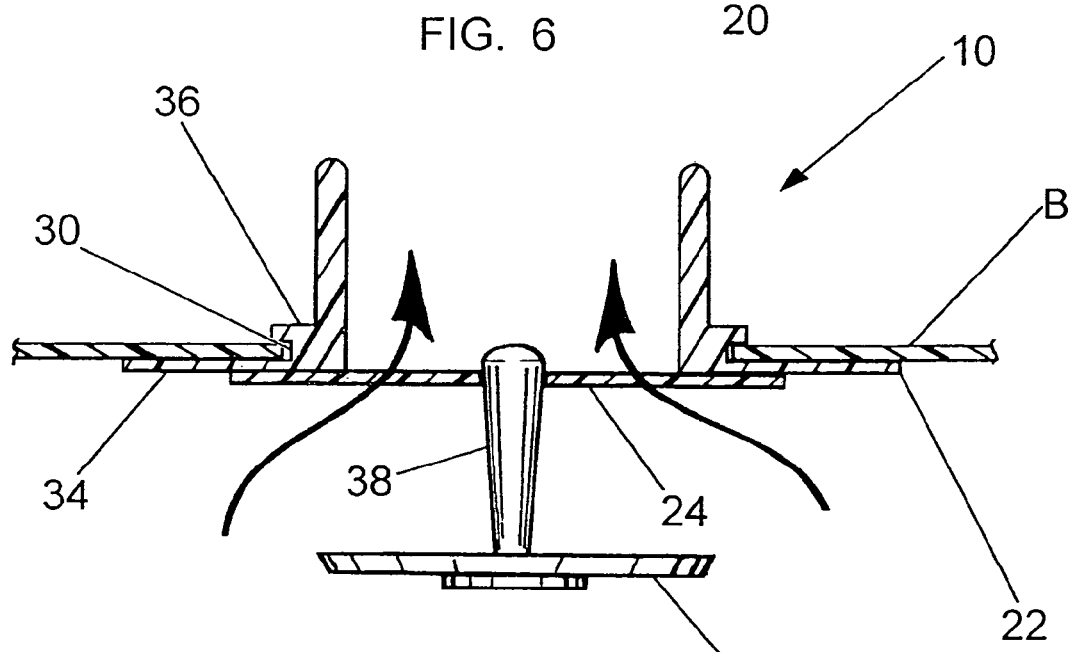
FIG. 7 is a side elevation view of the valve illustrated in FIG. 3, with the valve fully open.

Referring now to FIGS. 3 through 5, it may be seen that the valve assembly 10 of the present invention includes valve diaphragm 20 which is generally circular in shape and seats on flange 22, into which mounting bar 24 is disposed. Flange 22 is sealed against valve body 26 which is mounted in bag B and affixed by such as being ultrasonically welded, and preferably additionally disposed into annular groove 30 formed adjacent radial ring flanges 34 and 36. The integration of the bag B to the body 26 as at flanges 34, 36 creates an air-tight seal around the valve assembly 10. Valve diaphragm 20 is mounted on shaft 38, as by suitable attachment means as ultrasonic welding, a fastener such as a screw or by an adhesive. the connection between shaft 38 and valve diaphragm 20 may be reinforced as by adding a washer 40 overreaching the contact area between shaft 38 and diaphragm 20. Washer 40 is preferably of a resilient material however, exhibiting a greater durometer than diaphragm 20. Shaft 38 and diaphragm 20 are supported in valve assembly 10 by mounting bar 22, by being slidably received through orifice 39. As may be best observed in FIGS. 6 and 7, shaft 38 has a generally increasing diameter progressing from the end of the attachment of diaphragm 20 and the free end 42. The diameter for an extent adjacent the free end 42 is sufficiently greater than the orifice 39 in which shaft 38 is mounted. By such means, shaft 38 is retained in orifice 39 however, is free for axial movement as indicated in FIG. 6 whereby the valve may open and allow air to be added to bag B, or for the bag B to be evacuated as illustrated in FIG. 7. Free end 42 may exhibit the continued taper of shaft 38 as illustrated in FIG. 7, or have an extended section of a diameter sufficient to retain valve diaphragm 20 in the open position, as illustrated in FIG. 8 and later discussed.

Valve assembly 10 conventionally includes a protective cap 12, as illustrated in FIG. 3. Cap 12 may include a latching handle 14 which engages lugs 16 on body 26 to retain the cap in a tightly fitting relationship when closed. Cap 12 may include such as flat washer 17 which is engaged by the upper surface of an annular seal 18 on valve body 26.

Figure 8:
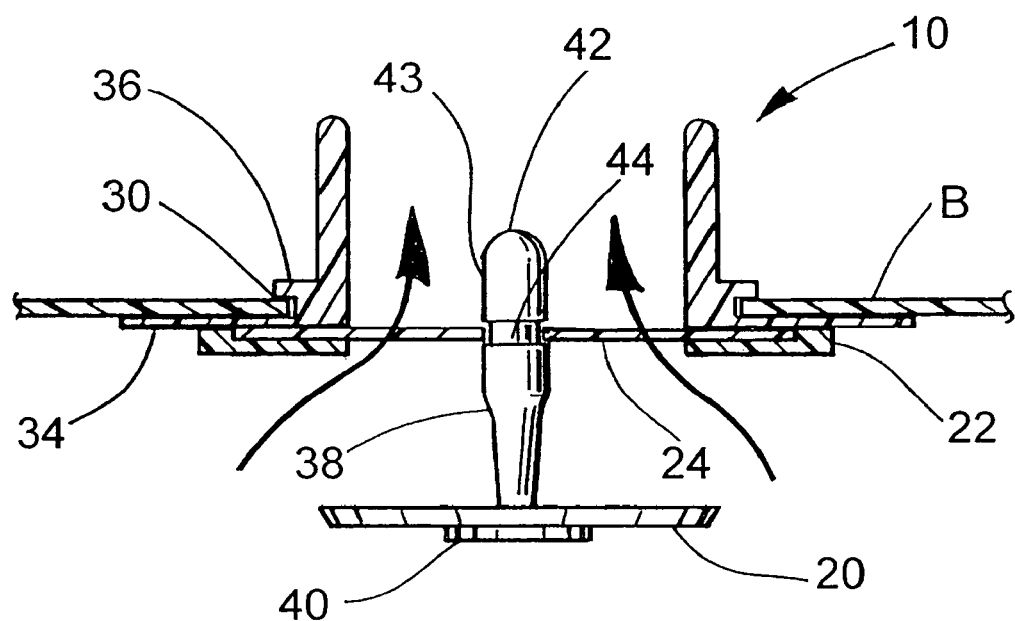
FIG. 8 is a side elevation view of the valve illustrated in FIG. 3 showing an alternative embodiment of the valve shaft.

FIG. 8 illustrates an alternative embodiment of valve assembly 10, wherein shaft includes a cylindrical section 43 which operates in conjunction with mounting bar 24 in retaining valve diaphragm 20 in the open position. In this alternative view, the cylindrical section 43 also includes an optional groove 44 which may receive the edge of bar 24 forming orifice 39 to provide a more positive restraint on the shaft 38 and valve diaphragm 20 to ensure the diaphragm remains in the open position during the evacuation of air from the inside of the bag.

Figure 9:
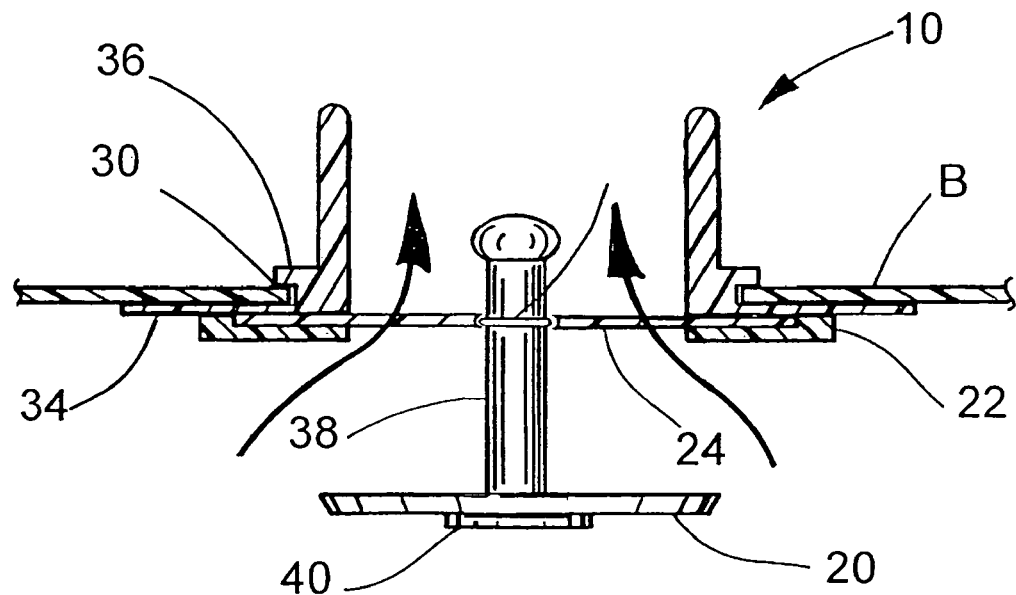
FIG. 9 is side elevation view of the valve illustrated in FIG. 7 showing an alternative embodiment of the valve shaft.

FIG. 9 illustrates a still further embodiment of valve assembly 10 herein shaft 38 has disposed thereon a raised ring 46, which is illustrated in the figure as approximately semi-circular and is generally complementary tin shape to a bar groove 48, so as to be securely retained therein. Shaft 38 further may include a knob 50 to provide ease in grasping the shaft 38 when it is desirable to release valve diaphragm 20 from the open position, as when getting ready to fill the bag B with air.

Figure 10:
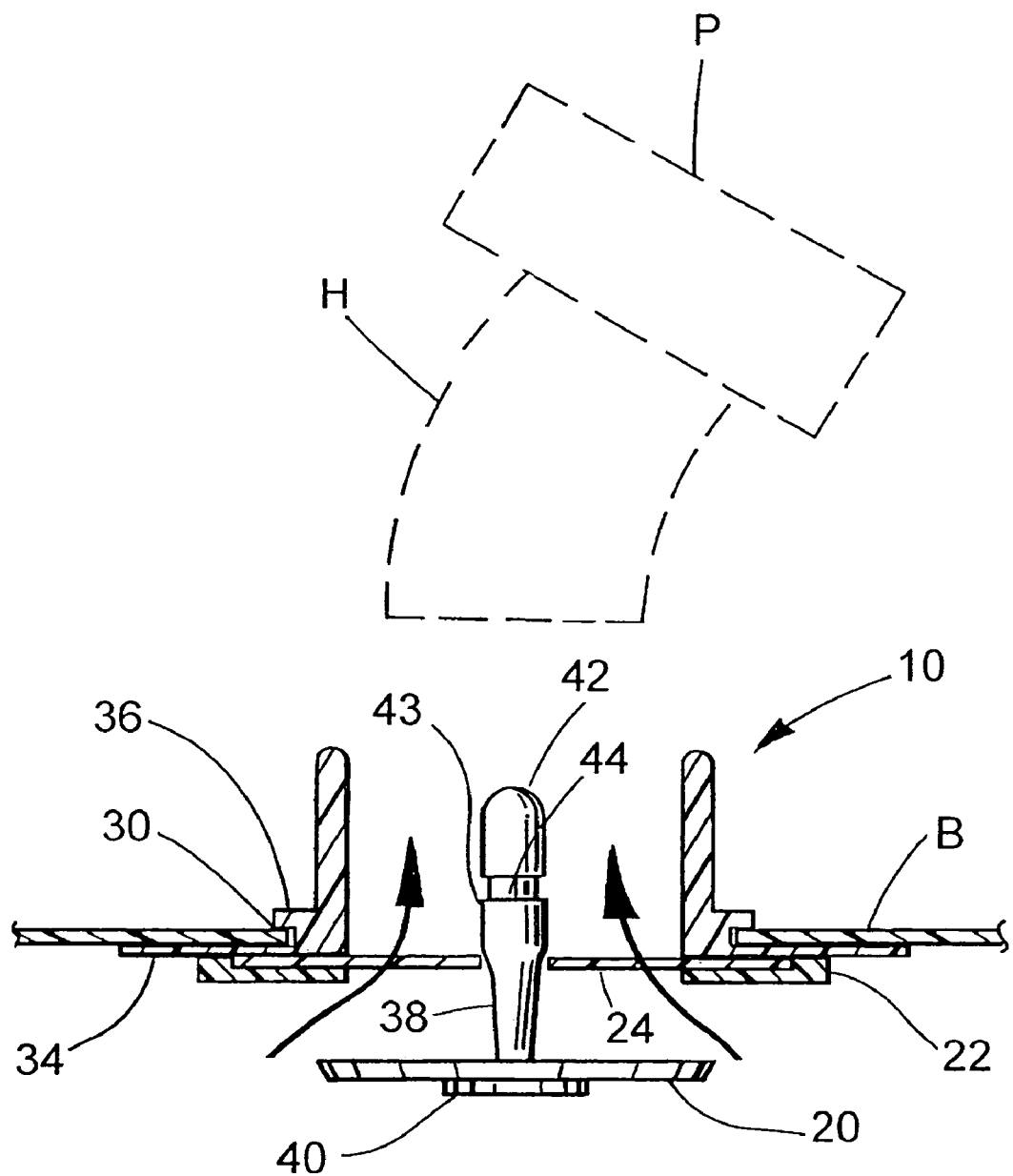
FIG. 10 is a side elevation of the valve illustrated in FIG. 8 showing that application of a hose connected to a pump to inflate the dunnage bag.

In operation, a conventional air supply hose H is applied to the opening of valve 10 as illustrated in FIG. 10. The flow of air from air pump P into valve body 26 forces valve diaphragm open and the bag B is filled to the desired pressure. the internal pressure of the air contained in the bag B causes the valve diaphragm to seat and seal against loss, as is illustrated in FIG. 4. On exhaust, valve assembly is opened as illustrated in FIG. 6, by pressing axially inwardly on shaft 38 until the enlarged section 38e of shaft 38 frictionally engages the sides of orifice 39 in mounting bar 24. The valve diaphragm is thereby retained in the open position and the air may exit as illustrated in FIG. 7. Valve diaphragm 20 may be released from orifice 39 by an upward pull on shaft 38 or by pressing washer 40 moving the assembly of diaphragm 20 and shaft 38 toward the closed position whereby shaft 38 rides freely in orifice 39.

Figure 11:
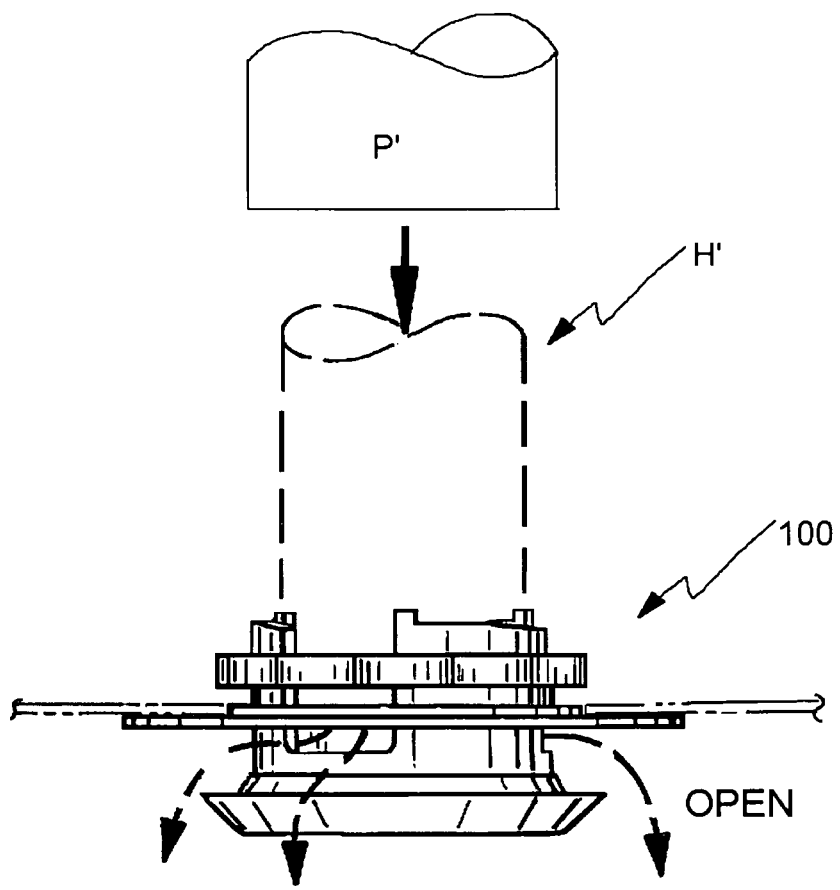
FIG. 11 is a side elevation view of an alternate embodiment of the dunnage valve in its open position.
Figure 12:
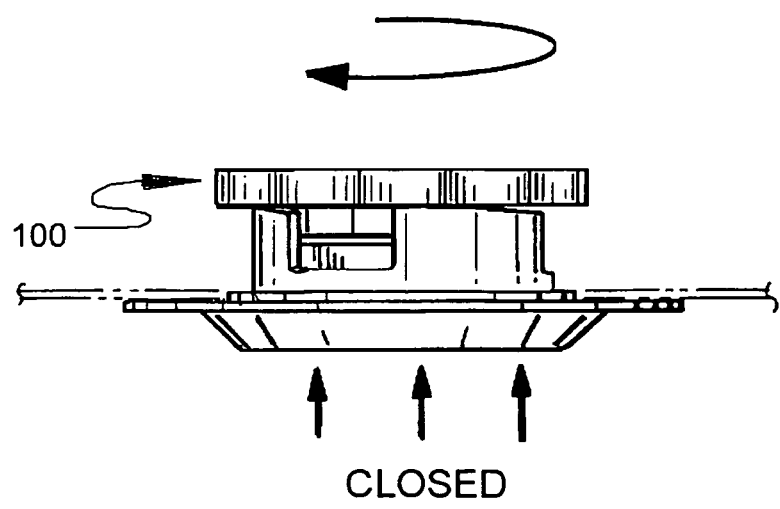
FIG. 12 is a side elevation view of the alternate embodiment of the dunnage valve in its closed position.
Figure 13:
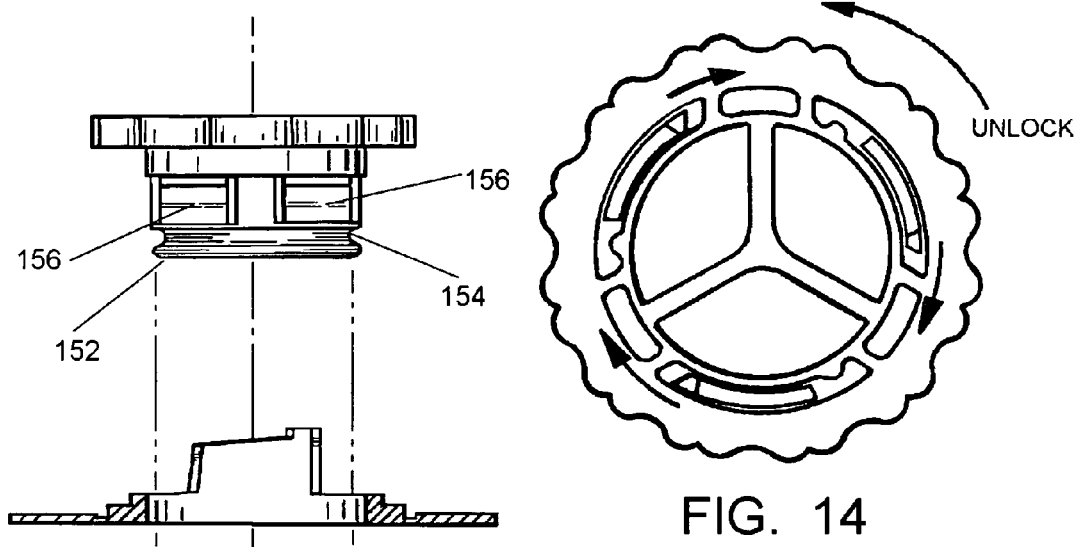
FIG. 13 is a side elevation, exploded view of the alternate embodiment of the dunnage valve.

Referring now to FIGS. 11 and 12, an alternative embodiment of the dunnage valve 100 is depicted in its open (FIG. 11) and its closed (FIG. 12) positions. The valve embodies the same basic principles as the former embodiment in that once the dunnage bag is inflated, the valve automatically closes and remains closed due to the pressure inside the bag. In addition, the valve uses friction to maintain an open position for deflating the dunnage bag and can be locked in a closed position.

Figure 17:
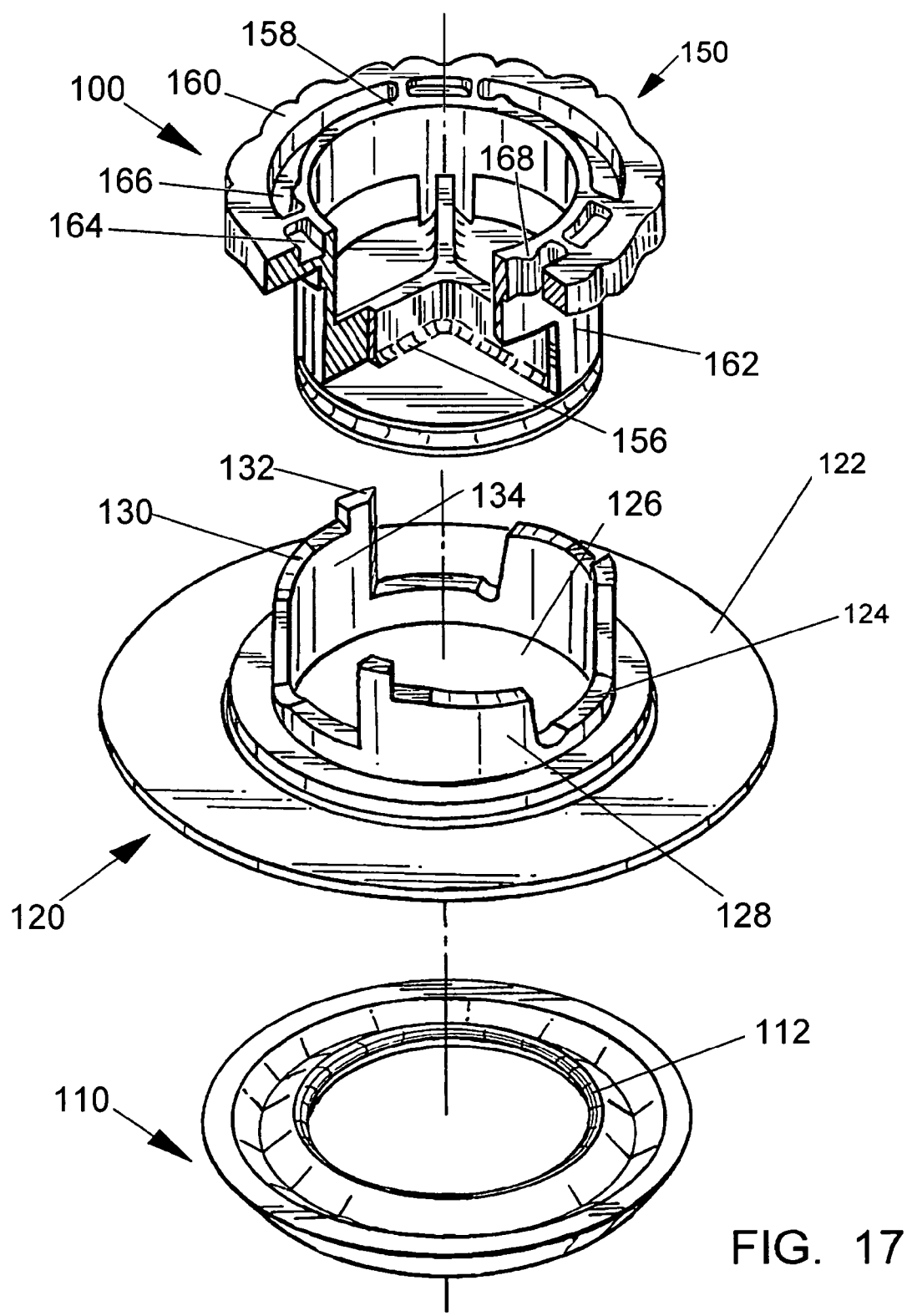
FIG. 17 is an exploded pictorial view of the alternate embodiment of the dunnage valve.

Referring now to FIG. 17, the various components of dunnage valve 100 can be seen. Valve 100 is comprised of diaphragm 110, valve body 120, and valve stem 150. Valve body 120 is preferably of a molded, single piece construction. Valve body 120 includes flange 122, the top side of which is hermetically sealed or conjoined to bag B as shown in FIG. 3 (note that in FIG. 3 a different embodiment of the dunnage valve is shown, but the flanges are the similar). Cylindrical wall 124 arises from flange 122 and defines aperture 126, through which the air for inflating the dunnage bag flows and through which valve stem 150 moves axially to open and close dunnage bag. Upstanding partial cylindrical wall extensions, preferably three, 128 arise from the upper surface of cylindrical wall 124. Each upstanding partial cylindrical wall extension 128 terminates in an upper surface 130. Each upper surface 130 slopes away from flange 122, preferably in a clockwise direction when looking at valve body 120 from above as in FIG. 14, to a flat section that terminates in a stop 132 that arises vertically from upper surface 130.

Referring again to FIG. 17, valve stem 150 is preferably of a molded, single piece construction. Valve stem 150 includes disc-shaped valve seat 152 that has groove 154 running around its circumference and ridges 156, preferably three, extending upwardly from the upper surface of valve seat 152. Opposing valve seat 152 is a pair of concentric rings: inner ring 158 and outer ring 160. Inner ring 158 has the same outer diameter as valve seat 152 and is connected to valve seat by members 162, of which there are preferably three. Additionally, the outside diameter of valve seat 152 and inner ring 158 is just smaller than the inside diameter of aperture 126 such that valve seat 152 and inner ring 158 freely slide through aperture 126. Outer ring 160 is connected to inner ring 158 by a plurality of ribs 164, preferably three, that are in vertical alignment with members 162, creating a plurality of arcuate slots 166, preferably three. Ribs 164 preferably have a length greater than the width of upstanding partial cylindrical wall extensions 128 so that upstanding partial cylindrical wall extensions 128 can pass freely though arcuate slots 166.

Additionally, the minimum height of inner ring 158 is equal to the height of outer ring 160 plus the height of cylindrical wall 124 plus the thickness of flange 122. Inner ring 158 also has a plurality of ridges 168, preferably three, on its outer surface spaced away from ribs 164 in a clockwise direction when looking at valve stem 150 from above as in FIG. 14. Ridges 168 run vertically down the outer surface of inner ring 158 beginning at the upper edge of inner ring 158 and terminate at a point no farther from the top of inner ring 158 than the height of outer ring 160.

Referring again to FIG. 17, diaphragm 110 is preferably made from a flexible, elastomeric material. Diaphragm 110 is removably connected to valve stem 150 by snapping raised circumferential ridge 112 seats into groove 154 on valve stem 150 after valve stem 150 has been passed through aperture 126.

Figure 14:
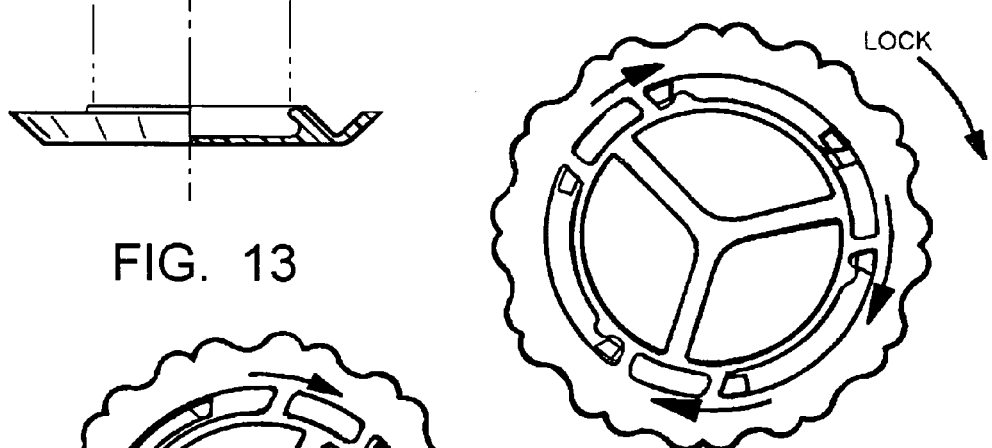
FIG. 14 is a partial top elevation of the alternate embodiment of the dunnage valve in its unlocked position.

Referring now to FIG. 11, in operation a conventional air supply hose H' is applied to the opening of valve 100 as illustrated in FIG. 11. Supply hose H' should have an outer diameter approximately equal to the inner diameter of inner ring 158 to form an airtight seal. As supply hose H' is inserted into valve stem 150, it forces valve 150 into its open position assuming valve 150 is in an unlocked state, as shown in FIG. 14. Supply hose H' is inserted into valve stem 150 until it contacts ridges 156. Air is then pumped into bag B from air pump P'. The air enters bag B via the gaps between members 162 as shown in FIG. 11. Once bag B is filled to the desired pressure, hose H is retracted from valve 100. As hose H is retracted, valve 100 closes and the pressure within bag B holds valve 100 in a closed position.

Once bag B is inflated and hose H' is removed, valve 100 can be locked in its closed position to prevent inadvertent opening while bag B is in use. This is accomplished by rotating valve stem 150 in a clockwise direction such that the lower surface of each rib 164 slides up the sloped upper surface 130 of one of the plurality of upstanding partial cylindrical wall extensions 128 until ribs 164 impinge on stops 132.

Figure 15:
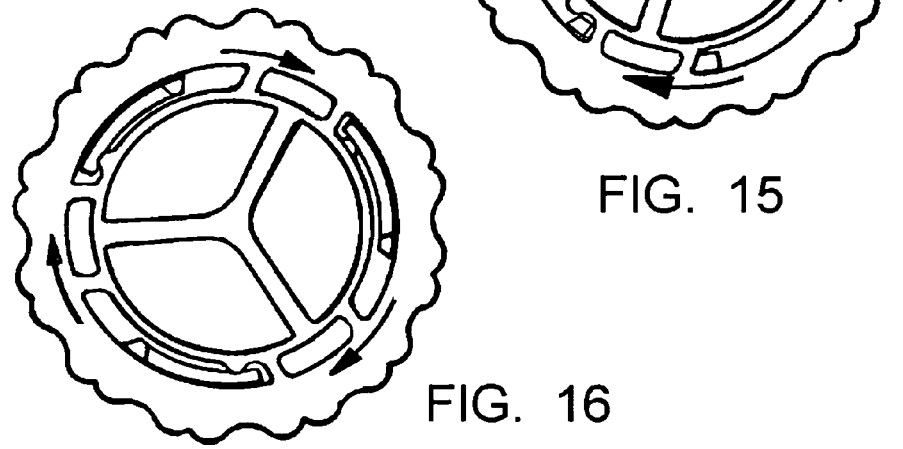
FIG. 15 is a partial top elevation of the alternate embodiment of the dunnage valve in its locked, closed position.
Figure 16:
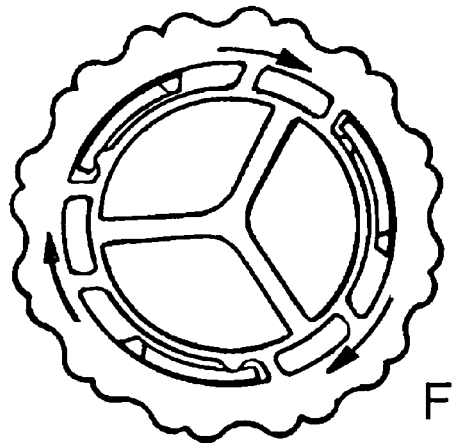
FIG. 16 is a partial top elevation of the alternate embodiment of the dunnage valve in its deflation position.

To deflate bag B, valve stem 150 is first rotated counter-clockwise from its closed, locked position (shown in FIG. 15) until ribs 164 impinge the clockwise leading edge of upstanding partial cylindrical wall extensions 128 (shown in FIG. 14). Valve 100 is then opened by pressing valve stem 150 into bag B until air is able to escape though the gaps between members 162 (air flow in the opposite direction of the arrows in FIG. 11). Valve 100 can be held in this open position by rotating valve stem clockwise such that ridges 168 engage inner surfaces 134 of upstanding partial cylindrical wall extensions 128 as shown in FIG. 16.

Those skilled in the art will recognize that numerous equivalent alternative structures may be fabricated utilizing functionally equivalent structure such as alternative resilient materials, attachment mechanisms and cooperative frictional holding techniques as those described and illustrated without departing from the scope and spirit of the invention.

The foregoing embodiments are presented by way of example only; the scope of the present invention is to be limited only by the following claims.

The invention claimed is:

1. A valve for an inflatable, bag-like container comprising:
   a generally cylindrical valve body having a lower circumferential flange; said flange having an upper surface and a lower surface; said upper surface of said flange being hermetically sealed to said container;
   said cylindrical valve body further including an upstanding cylindrical wall portion disposed above said flange and a plurality of upstanding partial cylindrical wall extensions extending generally above said cylindrical wall portion;
   a valve stem rotatably and axially moveably mounted in said valve body, said valve stem having a lower end and an upper end; and
   a circular valve diaphragm mounted on the lower end of said valve stem in hermetically sealed relationship to the lower surface of said flange when the upper end of said valve stem is moved axially away from said flange;

said valve stem having disposed on its upper end a pair of concentric rings in spaced relation, the outer ring being connected to the inner ring by a plurality of ribs extending from the inner ring thereby forming a plurality arcuate slots extending between said rings, said slots being axially aligned with said valve stem, each slot being disposed to receive one of said upstanding partial cylindrical wall extension therein; and said upper end of said valve stem further comprising means for interactively, frictionally engaging said upstanding side wall sections to lock said valve stem to said valve body at selected axial positions.

2. A valve as in claim 1 further comprising a closed position wherein the upper end of said valve stem is at its maximum axial distance from said flange and said diaphragm is hermetically sealed to the lower surface of said flange and an open position wherein the upper end of said valve stem is at its minimum axial distance from said flange and said diaphragm is not in contact with the lower surface of said flange whereby gas can flow through said valve.

3. A valve as in claim 2, wherein said means for interactively, frictionally engaging said upstanding partial cylindrical wall extensions to lock said valve in its closed position comprises rotating said valve stem such that the lower surface of said ribs engage the upper surface of said upstanding partial cylindrical wall extensions.

4. A valve as in claim 3, wherein the upper surface of each upstanding partial cylindrical wall extension slopes upwardly away from said flange in a clockwise direction and terminates in a stop whereby the side of said ribs impinge on said stops when said valve stem is rotated to lock said valve in its closed position.

5. A valve as in claim 2, wherein said inner concentric ring further comprises a plurality of ridges on the outer surface of said inner concentric ring, said ridges extending axially from the top of said inner concentric ring and having a length no greater than the thickness of said ribs; and said means for interactively, frictionally engaging said upstanding partial cylindrical wall extensions to lock said valve in its open position comprises rotating said valve stem such that said ridges engage the inner surface of said upstanding partial cylindrical wall extensions.

6. A valve as in claim 1, wherein the lower end of said valve stem further comprises a disc-shaped valve seat, said valve diaphragm being mounted on said valve seat.

7. A valve as in claim 6 wherein:

said valve seat further comprises a groove running around its circumference and said diaphragm further comprises a raised ridge concentric with the outer diameter of said diaphragm;

whereby said diaphragm is connected to said valve seat by snapping said raised ridge on said diaphragm into said groove on said valve seat.

8. A valve as in claim 7, wherein said valve stem further comprises a plurality of ridges arising from the upper surface of said valve seat.

9. A valve as in claim 8, wherein said valve seat and said inner concentric ring have the same outer diameter.

10. A valve as in claim 9, wherein said valve stem further comprises a plurality of members extending from the outer edge of said valve seat to said inner concentric ring.

11. The valve of claim 5 further comprising:

an open position wherein a gas can flow through said valve and a closed position wherein a gas cannot flow through said valve.

12. The valve of claim 6 further comprising:

a closed, unlocked position from which said valve stem can be moved axially into said open position and a closed, locked position from which said valve stem cannot be moved axially.

13. The valve of claim 7, wherein said valve is transitioned between its closed, locked position and its closed, unlocked position by rotating said valve stem no more than a quarter turn.

14. The valve of claim 8 further comprising:

a deflation position wherein said valve stem engages said valve body to prevent said valve from transitioning to its closed position while the gas in said inflatable, bag-like container is exiting said container through said valve.

15. The valve of claim 9, wherein said valve is transitions between its deflation position and its open position by rotating said valve stem no more than a quarter turn.

* * * * *